Patented May 21, 1935

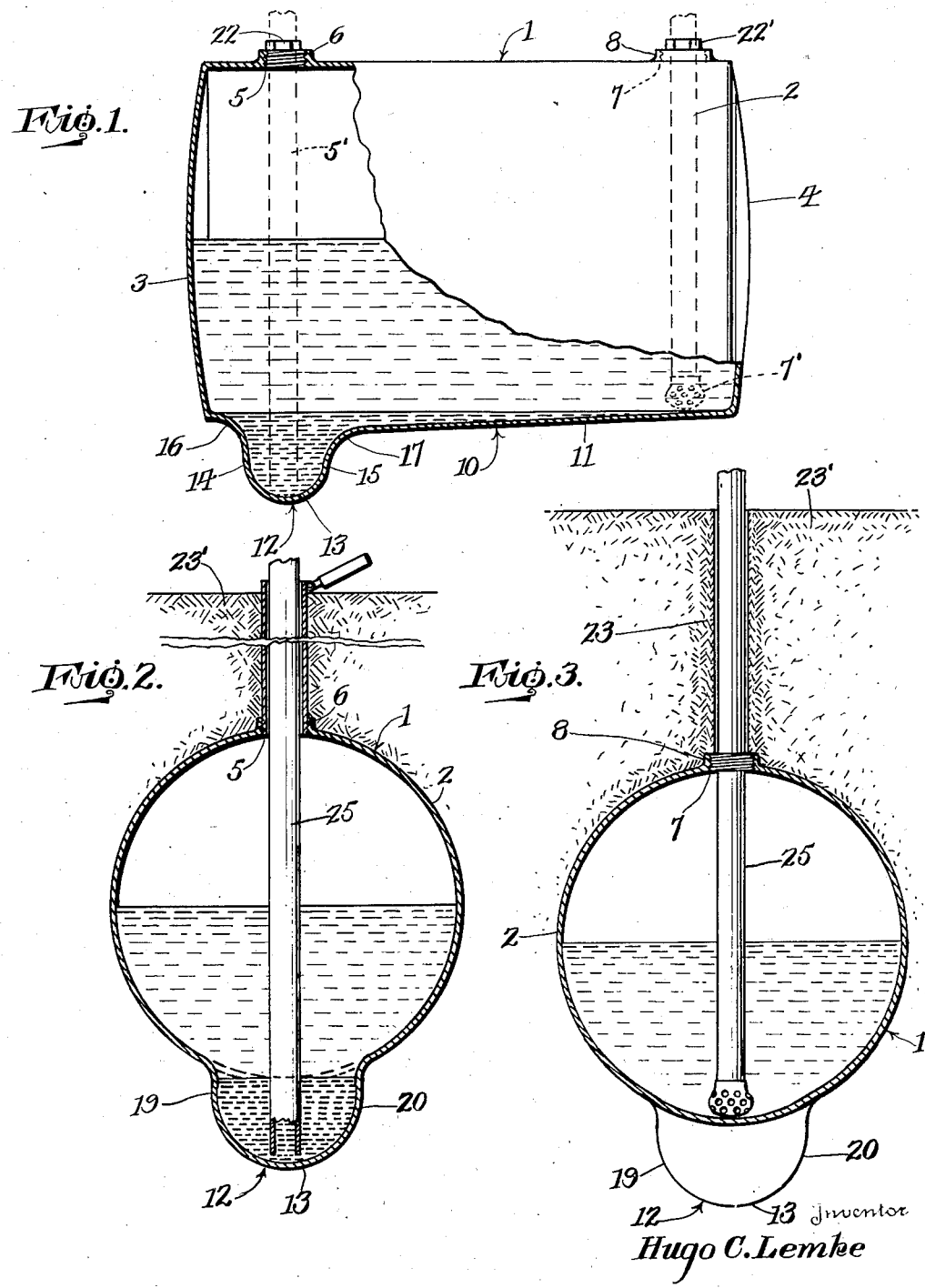

2,002,407

UNITED STATES PATENT OFFICE 2,002,407

FUEL STORAGE TANK

Hugo C. Lemke, Reedsville, Wis.

Application December 6, 1933, Serial No. 701,193

8 Claims. (Cl. 210—57)

This invention relates to a fuel storage tank, and has for its object to provide, a tank of the class referred to, so formed as to cause the trapping or collecting below the bottom of a body of fuel within the tank the foreign substances which are precipitated from the fuel whereby when the latter is withdrawn from the tank for consumption it will be clean.

A further object of the invention is to provide, in a manner as hereinafter set forth, a tank of the class referred to so formed as to collect the sediment and water which precipitates from a body of fuel and further permitting for the ready removal of such precipitates when desired thereby resulting in the fuel being clean of sediment and water when withdrawn from the tank for consumption.

A further object of the invention is to provide, in a manner as hereinafter set forth, a tank for the purpose referred to having a trap or bowl for collecting the precipitates from the fuel within the tank, and with the tank constructed in a manner to enable for removably extending therein a lift pump and a section line, the former for removing the trapped precipitates without the removal of any appreciable quantity of the fuel and the latter for delivering the fuel for consumption.

Further objects of the invention are to provide, in a manner as hereinafter set forth, a tank for the purpose referred to, which is simple in its construction and arrangement, strong, durable, compact, thoroughly efficient in its use, and comparatively inexpensive to manufacture.

In the drawing:

Figure 1 is a side elevation, broken away, and partly in longitudinal section, of the tank.

Figure 2 is a transverse sectional view of a modified form of tank at a point centrally of the filter pipe.

Figure 3 is a transverse sectional view of the form of tank shown in Figure 2 at a point centrally of the opening for the passage of the fluid section line.

Referring to each of the figures of the drawing, the tank generally indicated at 1 includes a horizontally disposed annular body 2 of the desired diameter and length. The body 2 is provided at each end with a closure head. The heads are designated 3, 4, are of like diameter and imperforate. The body 2 in its top and in close proximity to head 3 is formed with an opening 5 and an upstanding interiorly threaded upstanding collar 6. The wall of the opening 5 is threaded and registers with the inner face of collar 6. The threads of the latter form a continuation of the threads on the wall of opening 5. The body 2 in its top and in close proximity to head 4 is provided with an opening 7 and an upstanding interiorly threaded upstanding collar 8. The wall of opening 7 is threaded. The threads of collar 8 form a continuation of the threads of the wall of opening 7.

The bottom 10 of the body 2 includes a lengthwise extending portion 11 inclining downwardly throughout from its outer to its inner end and has its outer end merge into the bottom of head 4. The inner end of portion 11 is positioned between the transverse median of body 2 and the head 3. The bottom 10 also includes a depending hollow portion 12 disposed transversely with respect to body 2. The portion 12 is of flared contour in transverse cross section and in lengthwise cross section and has a bottom 13 of segmental cross section. The outer lengthwise part 14 of portion 12 is of greater height than the inner lengthwise part 15 of said portion 12. The upper end 16 of part 14 is of convex curvature, directed toward and merges directly into the bottom of head 3. The upper end 17 of part 15 is of convex curvature, directed inwardly and merges directly into the inner end of the portion 11. The side parts 19, 20 of portion 12 merge into the sides of body 2 and are disposed at opposite outward inclinations to provide for the lengthwise flare of portion 12 being greater than its transverse flare.

The portion 12 provides a sediment and water trap or bowl and is located in alignment with the opening 5. The portion 11 constitutes a runway functioning for the heavy precipitates from the body of fuel 21 to travel by gravity with the trap or bowl.

With reference to Figure 1 when the body 2 is used above the ground, a removable threaded plug 22 is employed for extension into collar 6 to close opening 5 and a removable threaded plug 22' is employed for extension into collar 8 to close opening 7. The opening 5 is employed for two purposes when the plug 22 is removed; one for the entrance of a feed line or pipe, not shown, to fill the tank with fuel, and the other for the entrance of a lift pump, as shown in dotted lines and designated 5' to extend into the trap near to the bottom of the latter for the purposes of removing the trapped precipitates. The opening 7, when plug 22' is removed is for the entrance of a suction line, as shown in dotted lines and designated 7' to deliver or dispense the fuel from the tank.

With reference to Figures 2 and 3, the tank is equipped in a manner to allow it to function for the purpose referred to when positioned below the ground level to comply with the requirements of certain municipalities, and in this connection there is secured to the threads of the wall of opening 5 and the threads of collar 6 a vertically disposed filter pipe 23 of a length to extend above the level of the ground 23' and normally closed at its upper end by a hinged cap 24. When the cap is thrown open, the tank may be filled with fuel if it be necessary. Now when it is desired to clean the tank, pipe 23 is opened at its top and a lift pump 25 extended through pipe 23 into tank 1 to a point in close proximity to the bottom of the trap for the purposes of removing the trapped precipitates. The opening 5, when the form of tank shown in Figures 2 and 3 is employed, is not closed by plug 22, but has passed therethrough a suction line 25 which enters into the tank. The line 25 extends from a point in proximity to the bottom of the tank and up through the ground 23' to above the level of the latter for the purpose of delivering or dispensing the fuel from the tank.

The hereinbefore described construction of tank provides for the collecting of foreign bodies from the fuel and will permit of the removal of such bodies before the fuel of the tank is discharged for consumption.

What I claim is:—

1. In a fuel storage tank, a horizontally disposed annular body, a pair of heads for closing the ends of said body, the top of said body being formed with a pair of spaced openings, the bottom of said body being formed with a portion disposed lengthwise thereof inclining downwardly throughout from its outer to its inner end, the outer end of said portion merging into the bottom of one of said heads and having its inner end portion disposed between the transverse median of said body and the other head of the pair, the remaining portion of said bottom being in the form of a trap disposed transversely with respect to said body, arranged in alignment with one of said openings, depending respectively from the inner end of said inclined portion and part of the lower portion of each side of said body, said trap having a portion extending inwardly from and depending with respect to the bottom of said other head, said trap being of flared contour both in transverse and lengthwise cross section thereof and having its sides, ends and bottom permanently closed.

2. In a fuel storage tank, a horizontally disposed annular body, a pair of heads for closing the ends of said body, the top of said body being formed with a pair of spaced openings, the bottom of said body being formed with a portion disposed lengthwise thereof inclining downwardly throughout from its outer to its inner end, the outer end of said portion merging into the bottom of one of said heads and the inner end of said portion being disposed between the transverse median of said body and the other head of the pair, the remaining portion of said bottom being in the form of a trap disposed transversely with respect to said body, arranged in alignment with one of said openings, depending respectively from the inner end of said inclined portion and the bottom of said other head, said trap being of flared contour both in transverse and lengthwise cross section thereof, and said trap including lengthwise inner and outer parts and a pair of side parts, said inner and outer parts having their upper ends directed upon oppositely extending convex curves merging respectively into the inner end of said inclined portion and the bottom of the said other head, the said outer part of the trap being inset inwardly with respect to said other head.

3. In a fuel storage tank, a horizontally disposed annular body, a pair of heads for closing the ends of said body, the top of said body being formed with a pair of spaced openings, the bottom of said body being formed with a portion disposed lengthwise thereof inclining downwardly throughout from its outer to its inner end, the outer end of said portion merging into the bottom of one of said heads and the inner end of said inclined portion being disposed between the transverse median of said body and the other head of the pair, the remaining portion of said bottom being in the form of a trap disposed transversely with respect to said body, arranged in alignment with one of said openings, depending respectively from the inner end of said inclined portion and the bottom of said other head, said trap being of flared contour both in transverse and lengthwise cross section thereof, and said trap including lengthwise inner and outer parts and a pair of side parts, said inner and outer parts having their upper ends directed upon oppositely extending convex curves merging respectively into the inner end of said inclined portion and the bottom of the inner face of the said other head, said trap having its outer lengthwise part of greater height than its inner lengthwise part and inset rearwardly with respect to said other head.

4. In a fuel storage tank, a horizontally disposed annular body, a pair of heads for closing the ends of said body, the top of said body being formed with a pair of spaced openings, each arranged in close proximity to one of said heads, the bottom of said body being formed with a portion disposed lengthwise thereof inclining downwardly throughout from its outer to its inner end, the outer end of said portion merging into the bottom of one of said heads and the inner end of said inclined portion being disposed between the transverse median of said body and the other head of the pair, the remaining portion of said bottom being in the form of a trap disposed transversely with respect to said body, arranged in alignment with one of said openings, depending respectively from the inner end of said inclined portion and the bottom of said other head, said trap being of flared contour both in transverse and lengthwise cross section thereof, and said trap including lengthwise inner and outer parts and a pair of side parts, said inner and outer parts having their upper ends directed upon oppositely extending convex curves merging respectively into the inner end of said inclined portion and the bottom of the inner face of the said other head, said trap having its outer lengthwise part of greater height than its inner lengthwise part and its lengthwise flare greater than its transverse flare, and said trap being inset inwardly with respect to the bottom of said head.

5. In a fuel storage tank, a horizontally disposed annular body, a pair of heads for closing the ends of said body, said body being formed at its top with a pair of spaced openings, the bottom of said body formed with a lengthwise disposed portion extending at a downward inclination from one of said heads to a point inwardly of and in spaced relation to the other of said heads, the remaining portion of said bottom being formed of series of imperforate parts depending from said portion, the other of said heads and the sides of said body and a horizontally disposed imperforate part integral with the lower ends of the said other parts, the said several parts coacting to provide a transversely disposed open top uninterrupted trap arranged inwardly of the said other head and aligning with one of said openings.

6. In a fuel storage tank, a horizontally disposed annular body, a pair of heads for closing the ends of said body, said body being formed at its top with a pair of spaced openings, the bottom of said body formed with a lengthwise disposed portion extending at a downward inclination from one of said heads to a point inwardly of and in spaced relation to the other of said heads, the remaining portion of said bottom being formed of series of imperforate parts depending from said portion, the other of said heads and the sides of said body and a horizontally disposed imperforate part integral with the lower ends of the said other parts, the said several parts coacting to provide a transversely disposed open top uninterrupted trap arranged inwardly of the said other head and aligning with one of said openings, and said heads being of like diameter.

7. In a fuel storage tank, a horizontally disposed annular body, a pair of heads for closing the ends of said body, said body being formed at its top with a pair of spaced openings, the bottom of said body formed with a lengthwise disposed portion extending at a downward inclination from one of said heads to a point inwardly of and in spaced relation to the other of said heads, the remaining portion of said bottom being formed of series of imperforate parts depending from said portion, the other of said heads and the sides of said body and a horizontally disposed imperforate part integral with the lower ends of the said other parts, the said several parts coacting to provide a transversely disposed open top uninterrupted trap arranged inwardly of the said other head and aligning with one of said openings, and said heads being imperforate and like diameter.

8. In a fuel storage tank, a horizontally disposed annular body, a pair of heads for closing the ends of said body, said body being formed at its top with a pair of spaced openings, the bottom of said body formed with a lengthwise disposed portion extending at a downward inclination from one of said heads to a point inwardly of and in spaced relation to the other of said heads, the remaining portion of said bottom being formed of series of imperforate parts depending from said portion, the other of said heads and the sides of said body and a horizontally disposed imperforate part integral with the lower ends of the said other parts, the said several parts coacting to provide a transversely disposed open top uninterrupted trap arranged inwardly of the said other head and aligning with one of said openings, an upstanding tubular member secured to the wall of that opening which aligns with the trap and provided at its upper end with a closure therefor, and said heads being of like diameter and imperforate.

HUGO C. LEMKE.